United States Patent
Hegde et al.

(10) Patent No.: US 9,178,999 B1
(45) Date of Patent: Nov. 3, 2015

(54) CONTACT CENTER MONITORING

(71) Applicant: Verizon Patent and Licensing Inc., Arlington, VA (US)

(72) Inventors: Mayuresh M. Hegde, Coppell, TX (US); Prashant Kamath, Carrollton, TX (US); Nitin Ahuja, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/456,173

(22) Filed: Aug. 11, 2014

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC .......... *H04M 3/5175* (2013.01); *H04M 3/5232* (2013.01)

(58) Field of Classification Search
CPC ............... H04M 3/5175; H04M 2203/401; H04M 2203/403; H04M 2203/404; H04M 2203/407; H04M 3/58

USPC ............. 379/265.07, 265.06, 265.05, 265.03, 379/265.01, 265.02, 265.09, 265.11, 265.12
See application file for complete search history.

(56) References Cited

U.S. PATENT DOCUMENTS

| 7,457,404 B1 * | 11/2008 | Hession et al. ........... 379/265.07 |
| 8,706,498 B2 * | 4/2014 | George ......................... 704/270 |
| 2011/0307258 A1 * | 12/2011 | Liberman et al. ............. 704/251 |
| 2014/0140496 A1 * | 5/2014 | Ripa et al. ................ 379/265.06 |

* cited by examiner

*Primary Examiner* — Thjuan K Addy

(57) ABSTRACT

A method may include receiving, at a call center, a call from a customer, identifying an agent to handle the call and forwarding the call to the agent. The method may also include monitoring the call to identify whether one or more particular words or phrases was voiced by the customer or the agent, determining, based on the monitoring, that a first word or phrase of the one or more particular words or phrases was voiced and generating an alert or message to forward to a workstation associated with a supervisor in response to determining that the first word or phrase or was voiced. The method may further include forwarding the alert or message to the workstation associated with the supervisor.

20 Claims, 11 Drawing Sheets

| 640 | | | |
|---|---|---|---|
| VIEW ▶ MY TEAM | FILTER BY ▶ ALL AGENTS | SORT BY ▶ CALL DURATION | |
| BILL JONES 00:02:22 | ON CALL | JEN THOMAS 00:03:49 | ON CALL |
| ⚠ R CHRONIC | CLOSE RATE: 21% | CLOSE RATE: 32% | |
| LISA SMITH 00:09:52 | ON CALL | MARY WELLS 00:15:24 | ON CALL |
| ((!)) DISCONNECT "BILL TOO HIGH" "EARLY TERMINATION FEE" | | CLOSE RATE: 41% | |
| ALERT | CUSTOMER INFO | JOIN CALL | |
| KEVIN JOHNSON 00:19:26 | ON CALL | SUSAN ROBERTS 00:24:01 | ON CALL |
| CLOSE RATE: 40% | | ⚠ Y CHRONIC | CLOSE RATE: 18% |

FIG. 6B

| VIEW ▶ | FILTER BY ▶ | SORT BY ▶ |
| MY TEAM | ALL AGENTS | CALL DURATION |

| BILL JONES 00:02:22 | ON CALL | JEN THOMAS 00:03:49 | ON CALL |
| ⚠ CHRONIC R | CLOSE RATE: 21% | | CLOSE RATE: 32% |
| LISA SMITH 00:09:52 | ON CALL | MARY WELLS 00:15:24 | ON CALL |
| (((!))) DISCONNECT "BILL TOO HIGH" "EARLY TERMINATION FEE" | | CLOSE RATE: 41% | IN CALL / LEAVE CALL / MUTE MIC |
| ALERT | CUSTOMER INFO | | |
| KEVIN JOHNSON 00:19:26 | ON CALL | SUSAN ROBERTS 00:24:01 | ON CALL |
| CLOSE RATE: 40% | | ⚠ CHRONIC Y | CLOSE RATE: 18% |

| VIEW ▶<br>MY TEAM | FILTER BY ▶<br>ALL AGENTS | SORT BY ▶<br>CALL DURATION | |
|---|---|---|---|
| BILL JONES<br>00:02:22 | ON CALL | JEN THOMAS<br>00:03:49 | ON CALL |
| ((!)) COACH AGENT<br>"CALL US BACK" | | CLOSE RATE: 21% | |
| LISA SMITH<br>00:09:52 | ON CALL | MARY WELLS<br>00:15:24 | ON CALL |
| CLOSE RATE: 37% | | CLOSE RATE: 41% | |
| KEVIN JOHNSON<br>00:19:26 | ON CALL | SUSAN ROBERTS<br>00:24:01 | ON CALL |
| CLOSE RATE: 40% | | ⚠ CHRONIC | CLOSE RATE: 18% |

FIG. 8

| VIEW ▶ MY TEAM | FILTER BY ▶ ALL AGENTS | SORT BY ▶ CALL DURATION | | | ▶ |
|---|---|---|---|---|---|
| BILL JONES 00:02:22 | ON CALL | JEN THOMAS 00:03:49 | ON CALL | | |
| CLOSE RATE: 41% | | CLOSE RATE: 21% | | | |
| LISA SMITH 00:09:52 | ON CALL | MARY WELLS 00:15:24 | ON CALL | | |
| CLOSE RATE: 37% | | ((!)) ACTIVATION FEE "WAIVE ACTIVATION FEE" | | | |
| KEVIN JOHNSON 00:19:26 | ON CALL | SUSAN ROBERTS 00:24:01 | ON CALL | | |
| CLOSE RATE: 40% | | ⚠ Y CHRONIC | CLOSE RATE: 18% | | |

FIG. 9

CONTACT CENTER MONITORING

BACKGROUND INFORMATION

Companies often use call centers to address customer inquiries, take customer orders and/or resolve customer problems. Interactive voice response (IVR) systems are frequently used to initially interact with the caller to obtain information regarding the call. The call is then often transferred to a human agent to service the customer and provide the desired assistance.

BRIEF DESCRIPTION OF THE DRAWINGS

FIGS. 6A-6C illustrate exemplary interface screens associated with monitoring calls and joining a call; and FIGS. 7-9 illustrate additional exemplary interface screens associated with monitoring calls.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to monitoring communications, such as phone calls, between a caller (also referred to herein as a customer) and an agent at a call center/contact center. In one implementation, a customer's call with an agent is monitored in real time to determine whether the call indicates an issue that should be brought to the attention of a supervisory agent. For example, a monitoring engine may identify key words or terms, voiced by the customer or the agent, that indicate a problem that may require help from the supervisor (e.g., the customer would like to cancel his/her service). An alerting engine may then access business rules and contextual information associated with the call, such as the caller's profile, the identity of the particular agent handling the call, the reason for the call, etc., to determine whether to forward a message or alert to the supervisor's workstation. In addition, the supervisor may be given an option to join the call between the customer and the agent to attempt to provide assistance to the customer. In some implementations, alerts of different levels may be provided to the supervisor based on the particular key words/terms identified during the conversation and the type of issue associated with the identified words/terms. In addition, in some implementations, calls between customers and agents may be monitored at a later time to determine whether the agent is following the proper guidelines and providing good service to the customers.

Figure 1:
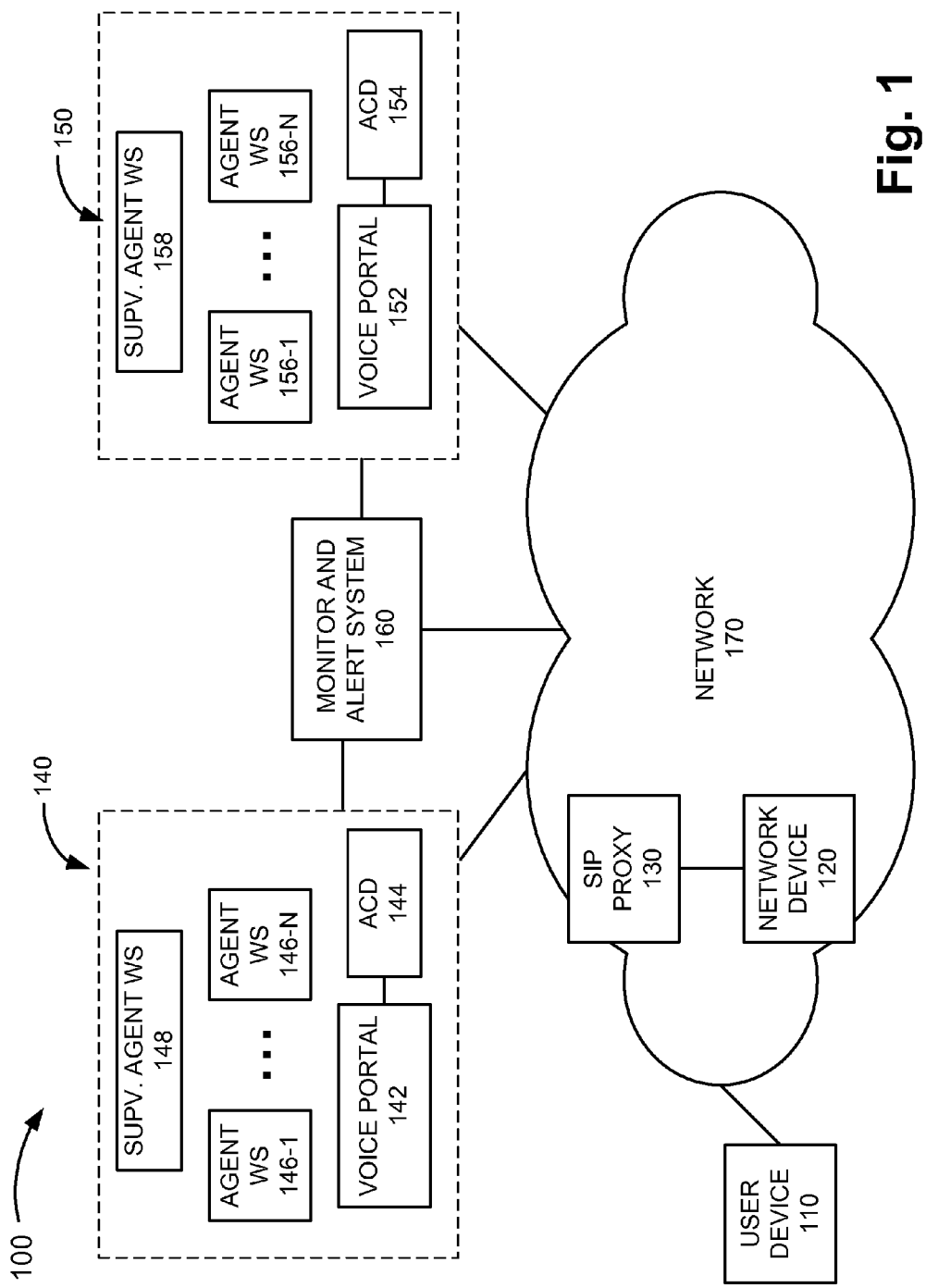
FIG. 1 illustrates an exemplary network in which systems and methods described herein may be implemented.

FIG. 1 is a block diagram of an exemplary network 100 in which systems and methods described herein may be implemented. Referring to FIG. 1, network 100 includes user device 110, network device 120, session initiation protocol (SIP) proxy 130, call centers 140 and 150, monitor and alert system 160 and network 170.

User device 110 may include any type of communication or computation device that is capable of transmitting and receiving voice signals and/or data to/from a network, such as network 170. For example, user device 110 may include any standard telephone, cordless telephone, cellular telephone, or other type of conventional telephone that interfaces with a public switched telephone network (PSTN) and/or wireless network to place and receive telephone calls. User device 110 may also include any client, such as a computer device, a web-based appliance, etc., that is configured to provide telephone functions using, for example, voice over Internet protocol (VoIP), H.323 protocol, etc. For example, user device 110 may include a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

User device 110 may further include any type of communication or computation device, such as a PC, laptop computer, tablet computer, personal digital assistant, cell phone, etc., that is capable of transmitting data (e.g., emails, text messages, instant messages, facsimiles, etc.), video data (e.g., video calls, video chats, video messages, etc.) and/or voice data (e.g., voice calls) to/from a network, such as network 170.

Network device 120 may include one or more devices that allow divergent transport networks to communicate and cooperatively carry traffic. For example, network device 120 may include a gateway that provides for interoperation at two levels, e.g., between different signaling schemes and between different media forms. As an example, network device 120 may adapt between SS7 signaling of network 170 and session initiation protocol (SIP), H.323 protocols or other protocols (e.g., Internet protocols (IPs) or Internet based protocols) used by other devices in network 100. In one implementation, network device 120 may convert time division multiplexed (TDM) encoded voice signals to a packetized data stream suitable for transport to and processing by a proxy device, such as SIP proxy 130.

Network device 120 may also include one or more session border controllers (SBCs) that provide control of the boundary between different service provider networks, provide signaling protocol inter-working between an IP-based network and other service provider networks, control the transport boundary between service provider networks, and provide usage metering and Quality of Service (QoS) measurements for media flows. In one implementation, network device 120 may correspond to an ingress point to SIP proxy 130. For example, network device 120 may receive a VoIP call from user device 110 and forward the VoIP call to SIP proxy 130.

SIP proxy 130 may include a server/computing device that is able to receive data from network device 120 and forward the received data to an appropriate voice portal, such as voice portal 142 or 152 (described below) using SIP protocol. In other implementations, SIP proxy 130 may be able to receive and forward data via another protocol, such as H.323.

Call center 140 may represent a call center configured to receive and handle a large volume of calls. Call center 140 may include voice portal 142, automatic call distributor (ACD) 144, agent workstations (WSs) 146-1 through 146-N (referred to collectively as agent WSs 146 or individually as agent WS 146) and supervisory agent workstation (WS) 148.

Voice portal 142 may represent a front end device associated with call center 140. In an exemplary implementation, voice portal 142 may include an interactive voice response (IVR) unit that interacts with callers to obtain information associated with the call, such as information identifying a reason for the call (e.g., billing issue, service issue, etc.). The IVR unit may also interact with the caller to identify whether the call is a follow up or repeat call regarding an issue that has not been resolved, as described in more detail below. Voice portal 142 may also automatically track how many calls have been made from a particular customer, how many calls have been made regarding a particular issue (e.g., a service issue, a billing issue, etc.), etc.

ACD 144 may distribute calls received at voice portal 142 to one of agent WSs 146-1 through 146-N. ACD 144 is illustrated as being a separate component that is located externally from voice portal 142. In some implementations, ACD 144 may be part of voice portal 142 (e.g., a sub-component of voice portal 142). In each case, ACD 144 may forward calls to an available one of the agent WSs 146.

Agent WSs 146 may represent a workstation/computer and operator who handles calls from callers that require human intervention. In an exemplary implementation, agent WSs 146 may be associated with voice portal 142 and ACD 144. In addition, in an exemplary implementation, agent WSs 146 may be connected to ACD 144 and/or voice portal 142 via a network, such as network 170. In alternative implementations, agent WSs 146 may be connected directly to ACD 144 and/or voice portal 142, connected via a LAN, connected via a private network, etc.

Supervisory agent WS 148 may represent a workstation/computer and supervisor who oversees or is responsible for monitoring calls being handled by a number of different agents, such as agents associated with agent WSs 146. For example, supervisory agent WS 148 may be associated with a call center supervisor or manager that manages a portion of the agents at call center 140.

Agent WSs 146 and supervisory agent WS 148 may each include a workstation or computer, such as a personal computer or laptop. Agent WSs 146 and supervisory agent WS 148 may each include any device capable of performing IP based messaging, such as VoIP, to transmit voice, video and/or text. Agent WSs 146 and supervisory agent WS 148 may also include any telephone device (not shown) to place and receive telephone calls. For example, the telephone device may be a standard telephone, a cordless telephone, a cellular telephone or any other type of telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device. In some implementations, agent WSs 146 and supervisory agent WS 148 may include speech recognition hardware/software that receives voice responses from a caller and identifies what the caller has voiced.

Call center 150 may represent another call center designed to receive and handle calls. For example, call center 140 and call center 150 may be associated with the same business entity, but may be designated for handling different types of calls/inquiries. As an example, call center 140 may be designated for handling customer orders and call center 150 may be designated for resolving customer problems. Referring to FIG. 1, call center 150 may include voice portal 152, ACD 154, agent workstations (WSs) 156-1 through 156-N (referred to collectively as agent WSs 156 or individually as agent WS 156) and supervisory agent WS 158. Voice portal 152, ACD 154, agent WSs 156 and supervisory agent WS 158 may be configured to operate in a similar manner as voice portal 142, ACD 144, agent WSs 146 and supervisory agent WS 148, as described above with respect to call center 140.

Monitor and alert system 160 may include one or more computing devices, servers, memory devices, etc., that monitor calls from customers while the calls are being handled by agents. For example, monitor and alert system 160 may include speech recognition software that converts the audio into text and identifies one or more key words or terms voiced by the customer or the agent during the call. If a key word/term is identified, such as "cancel my service," monitor and alert system 160 may send an alert to a supervisory agent in response to detecting the key words/terms. In some instances, monitor and alert system 160 may automatically link the supervisory agent into the call between the customer and the agent to allow the supervisory agent to interact with the customer directly, as described in detail below.

Network 170 may include one or more wired, wireless and/or optical networks that are capable of receiving and transmitting data and voice signals to enable devices illustrated in FIG. 1 to communicate. For example, network 170 may include one or more public switched telephone networks (PSTNs) or another type of switched network. Network 170 may also include one or more wireless networks and may include a number of transmission towers for receiving wireless signals and forwarding the wireless signals toward the intended destination. Network 170 may further include one or more satellite networks, one or more packet switched networks, such as an Internet protocol (IP) based network, a local area network (LAN), a wide area network (WAN), an intranet, the Internet, or another type of network that is capable of transmitting telecommunications traffic (e.g., voice, video and/or data traffic). For example, network 170 may include one or more SIP-based networks, one or more H.323/H.225-based networks, or any other type of packet switched network that is capable of transmitting traffic from a source device to a destination device.

The exemplary configuration illustrated in FIG. 1 is provided for simplicity. It should be understood that a typical network may include more or fewer devices than illustrated in FIG. 1. For example, one user device 110, one network device 120, one SIP proxy 130, two call centers 140 and 150, one monitor and alert system 160 and one network 170 are shown for simplicity. It should be understood that network 100 may include a large number (e.g., hundreds or thousands) of user devices, work stations, a number of other networks and/or voice portals. As an example, in one implementation, each of call centers 140 and 150 may include hundreds of agent WSs, multiple supervisory agent WSs and multiple ACDs. Further, additional and/or different switching devices, routing devices, etc., involved in routing communications and data between user devices, such as user device 110, call centers 140 and 150 and monitor and alert systems 160 may be included in network 100. In addition, network 100 may include various components associated with providing call back services to callers/customers, as described in more detail below.

Further, various functions are described as being performed by particular components or devices in network 100.

In other implementations, various functions described as being performed by one component/device may be performed by another component/device or various functions described as being performed by multiple components/devices may be combined and performed by a single component or device.

Figure 2:
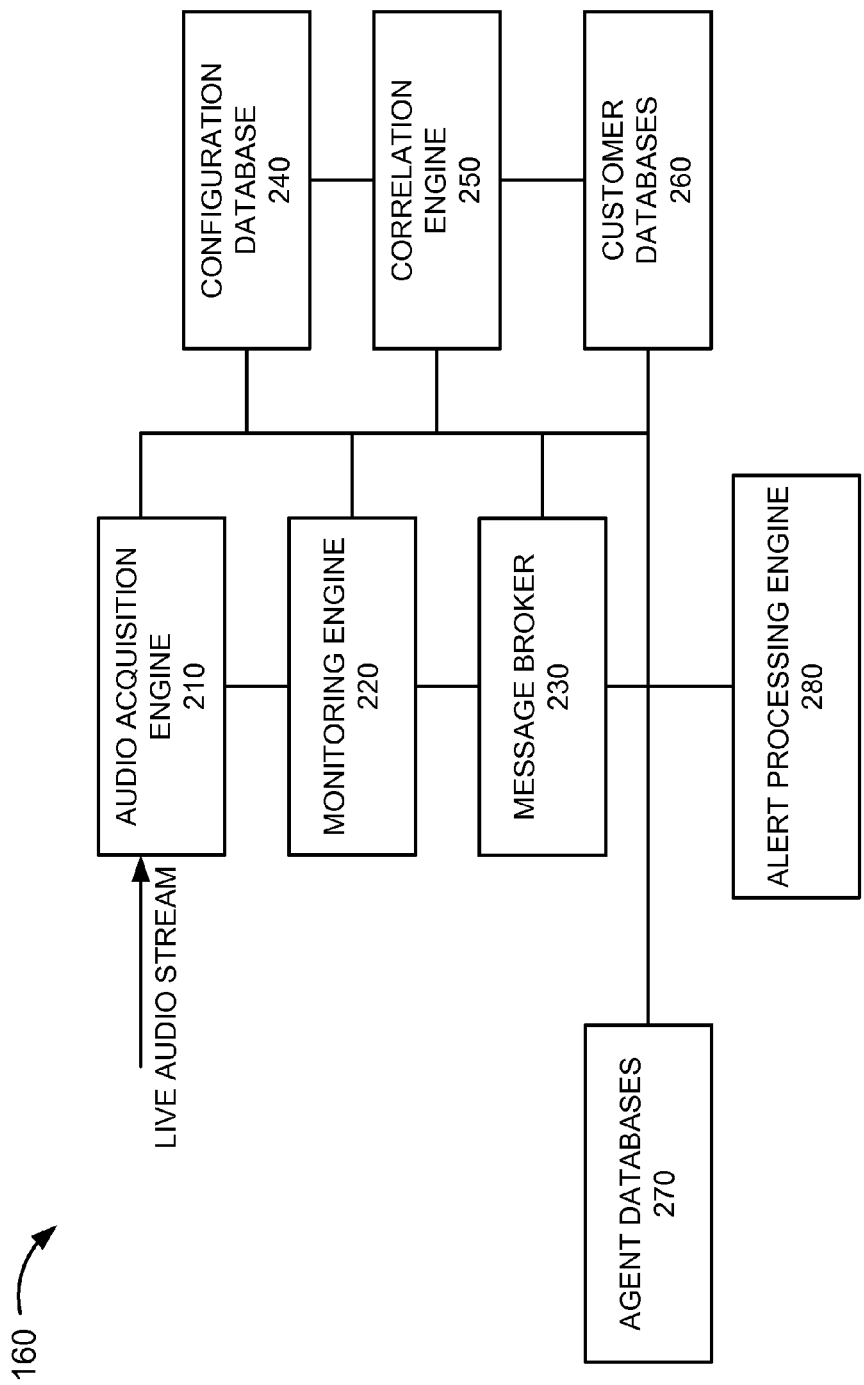
FIG. 2 illustrates exemplary components included in the monitor and alert system of FIG. 1.

FIG. 2 illustrates exemplary components implemented in monitor and alert system 160. In an exemplary embodiment, some or all of the components illustrated in FIG. 2 may be implemented in one of call centers 140 or 150, or may be located externally to call centers 140/150. Referring to FIG. 2, monitor and alert system 160 includes audio acquisition engine 210, monitoring engine 220, message broker 230, configuration database 240, correlation engine 250, customer databases 260, agent databases 270 and alert processing engine 280.

Audio acquisition engine 210 may include one or more computing devices, servers or processors that receive and process live audio streams corresponding to a user's (e.g., a customer's) interaction with an agent. For example, audio acquisition engine 210 may receive live audio while a customer is interacting with an agent at one of call centers 140 or 150 via, for example, a gateway server or other network device. Audio acquisition engine 210 may also include speech recognition software that converts speech from the customer's conversation with the agent to text.

Monitoring engine 220 may include one or more computing devices, servers or processors that process the text generated by audio acquisition engine 210 to determine whether the caller or the agent has voiced one more key words or terms. For example, terms or words such as "cancel," "too high," "no way," or "ridiculous," may indicate a customer's displeasure or problem with the customer's interaction with the agent, as described in more detail below.

Monitoring engine 220 may also detect emotion, such as anger, frustration, etc., in the live data stream. For example, monitoring engine 220 may detect that the customer has raised his/her voice above some threshold sound level, uttered words/phrases typically associated with anger or frustration, such as "I'm mad about this," I'm upset," etc.

Message broker 230 may include one or more computing devices, server devices or processors associated with generating real time alerts or messages to various parties based on input received from monitoring engine 220. For example, if monitoring engine 220 determines that one or more terms have been voiced that correspond to a customer potentially canceling his/her service, message broker 230 may generate a real time speech alert with a high priority indicator.

Configuration database 240 may include one or more computing devices, servers, processors or memories associated with a list of agents to be monitored. For example, configuration database 240 may store a list of all agents that are on duty at any given time. In one implementation, configuration database 240 may identify agents that are to be monitored on a regular basis, such as agents that have been identified as poor performing agents, agents with a low success rate, etc., as described in more detail below. In some implementations, configuration database 240 may store information identifying levels of monitoring to be performed for agents based on the agents' ratings. For example, a poor performing agent may be monitored for all levels of alerts, while a high performing agent may only be monitored with respect to the most important type of alert, such as a customer potentially canceling his/her service.

Correlation engine 250 may include one or more computing devices, servers or processors associated with identifying appropriate actions for calls in which a problem may exist. For example, correlation engine 250 may identify a next best action by a service provider providing a product or service for which the customer called the call center, based on words/terms identified by monitoring engine 220.

In some implementations, correlation engine 250 also identifies contextual information associated with the call, such as the reason for the call, the particular agent's experience and success rate in handling similar calls, etc. Correlation engine 250 may also identify contextual information regarding the customer, such as whether the customer is a "premium" customer that subscribes to the highest level of service, such as telephone, television and Internet services from a service provider associated with the call center, or whether the customer is an average customer that only subscribes to, for example, telephone services. Correlation engine 250 may further identify contextual information, such as whether the customer is a frequent caller, the agent's overall rating, as well as other attributes associated with the customer, the agent handling the call and/or the reason for the call. In each case, correlation engine 250 and/or alert processing engine 280 may use the contextual information to aid in determining the next best action for monitor and alert system 160. For example, correlation engine 250 and/or alert processing engine 280 may limit the number of alerts sent to supervisors based on various external factors, such as contextual information associated with the call, to allow supervisors to concentrate only on calls that require supervisor assistance, as described in more detail below.

Customer databases 260 may include one or more computing devices, servers, processors or memory devices associated with storing customer profile information, interaction profile information, billing profile information, etc. For example, customer databases 260 may include information regarding a level of service subscribed to by a customer, such as premium subscriber, mid-tier subscriber, etc. Customer databases 260 may also store information regarding interactions between the customer and one of call centers 140 and 150. For example, customer databases 260 may store information identifying how many times the customer has contacted the call center, the nature of the customer's interaction with the agent (positive, did not cancel his/her service, ordered another product/service, etc.). Customer databases 260 may also store information identifying the customer's billing information.

Agent databases 270 may include one or more computing devices, servers, processors or memory devices associated with storing agent-related information, such as agent statistics, agents' supervisors, customer information, etc. For example, agent databases 270 may store one or more key performance indicators (KPIs) indicating each agent's performance level. As an example, one KPI for an agent handling calls for a service provider that provides telephone, television and/or Internet services may be a "save" rate. The save rate may represent calls handled by the agent that resulted in the customer maintaining his/her service. Another KPI for a service provider may be an upsell rate, which may represent calls handled by the agent resulting in the customer ordering another product/service, or an upgraded product/service.

Agent databases 270 may also include a database of agents and supervisors for each agent. For example, a hierarchical listing of the agent and one or more levels of supervisory agents may be provided for each agent. Agent databases 270 may further include a database of real time desktop alerts generated for each agent, based on one or more terms identified by monitoring engine 220 for previous calls.

Alert processing engine 280 may include one or more computing devices, servers, processors and/or memory devices associated with generating and/or forwarding alerts, messages, etc., for calls that are in progress. In one implementation, alert processing engine 280 acts as a centralized entity that receives information regarding potential alerts, selects an appropriate response based on stored rules associated with handling problems, and forwards the selected message/alert to appropriate parties. In some implementations, alert processing engine 280 receives information/feeds from other systems, such as systems at one of call centers 140 and 150 or other devices in monitor and alert system 160 (e.g., configuration database 240, correlation engine 250, customer databases 260, agent databases 270, etc.) that provide contextual information regarding a call. In such implementations, alert processing engine 280 may use the contextual information to determine whether to forward and alert/message to supervisor and the appropriate alert/message, as described in more detail below.

The exemplary configuration illustrated in FIG. 2 is provided for simplicity. It should be understood that a typical network may include more or fewer devices than illustrated in FIG. 2. For example, monitor and alert system 160 may include multiple audio acquisition engines 210, monitoring engines 220, message brokers 230, configuration databases 240, correlation engines 250, customer databases 260, agent databases 270 and alert processing engines 280. Further, various functions are described as being performed by particular components/devices in FIG. 2. In other implementations, various functions described as being performed by one component/device may be performed by another component/device or various functions described as being performed by multiple components/devices may be combined and performed by a single component/device.

Figure 3:
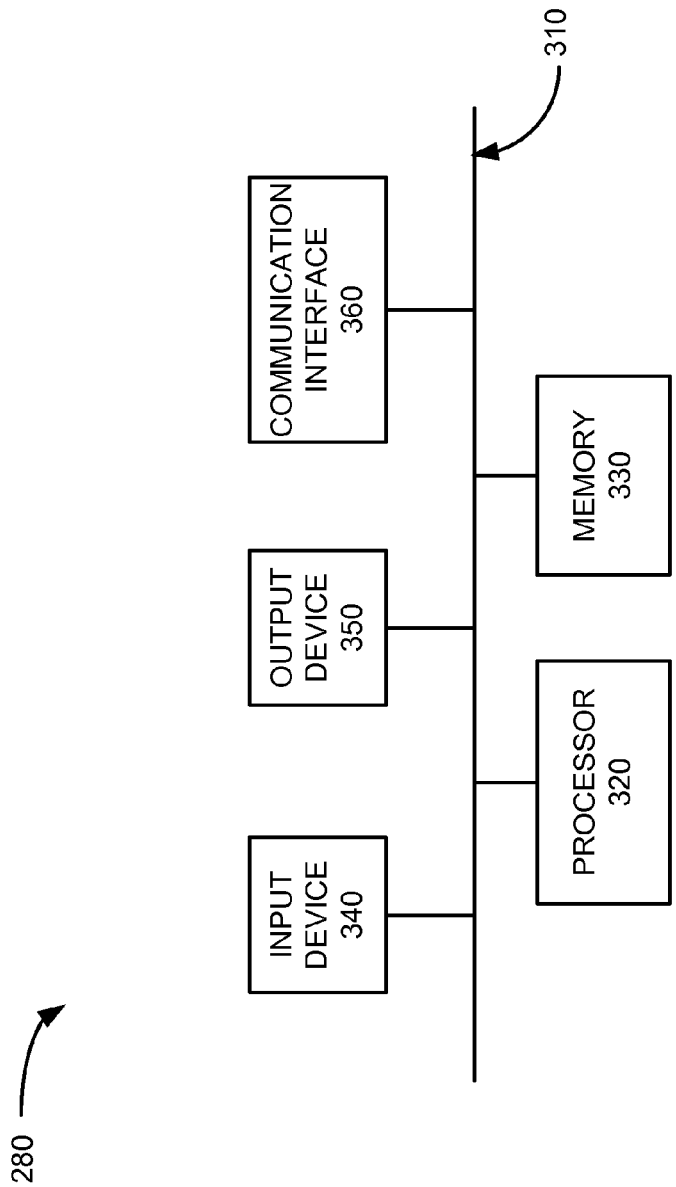
FIG. 3 illustrates an exemplary configuration of one or more of the components of FIGS. 1 and 2.

FIG. 3 illustrates an exemplary configuration of alert processing engine 280. Other devices in network 100, such as audio acquisition engine 210, monitoring engine 220, message broker 230, configuration database 240, correlation engine 250, customer databases 260 and agent databases 270 may be configured in a similar manner. In addition, other devices illustrated in FIG. 1, such as user device 110, network device 120, SIP proxy 130, voice portals 142 and 152, ACDs 144 and 154, agent workstations 146 and 156 and supervisory agent workstations 148 and 158 may be configured in a similar manner. Referring to FIG. 3, alert processing engine 280 includes bus 310, processor 320, memory 330, input device 340, output device 350 and communication interface 360. Bus 310 may include a path that permits communication among the elements of alert processing engine 280.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to alert processing engine 280, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD), a printer, a speaker, etc.).

Communication interface 360 may include a transceiver that alert processing engine 280 uses to communicate with other devices (e.g., audio acquisition engine 210, monitoring engine 220, message broker 230, configuration database 240, correlation engine 250, customer databases 260, agent databases 270, etc.) via wired, wireless or optical mechanisms. Communication interface 360 may also include one or more radio frequency (RF) transmitters, receivers and/or transceivers and one or more antennas for transmitting and receiving RF data via network 170. Communication interface 360 may also include a modem or an Ethernet interface to a LAN or other mechanisms for communicating with elements in a network, such as network 170 or another network.

The exemplary configuration illustrated in FIG. 3 is provided for simplicity. It should be understood that alert processing engine 280 (audio acquisition engine 210, monitoring engine 220, message broker 230, configuration database 240, correlation engine 250, customer databases 260 and agent databases 270) may include more or fewer devices than illustrated in FIG. 3. In an exemplary implementation, alert processing engine 280 (or other devices illustrated in FIGS. 1 and 2) may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
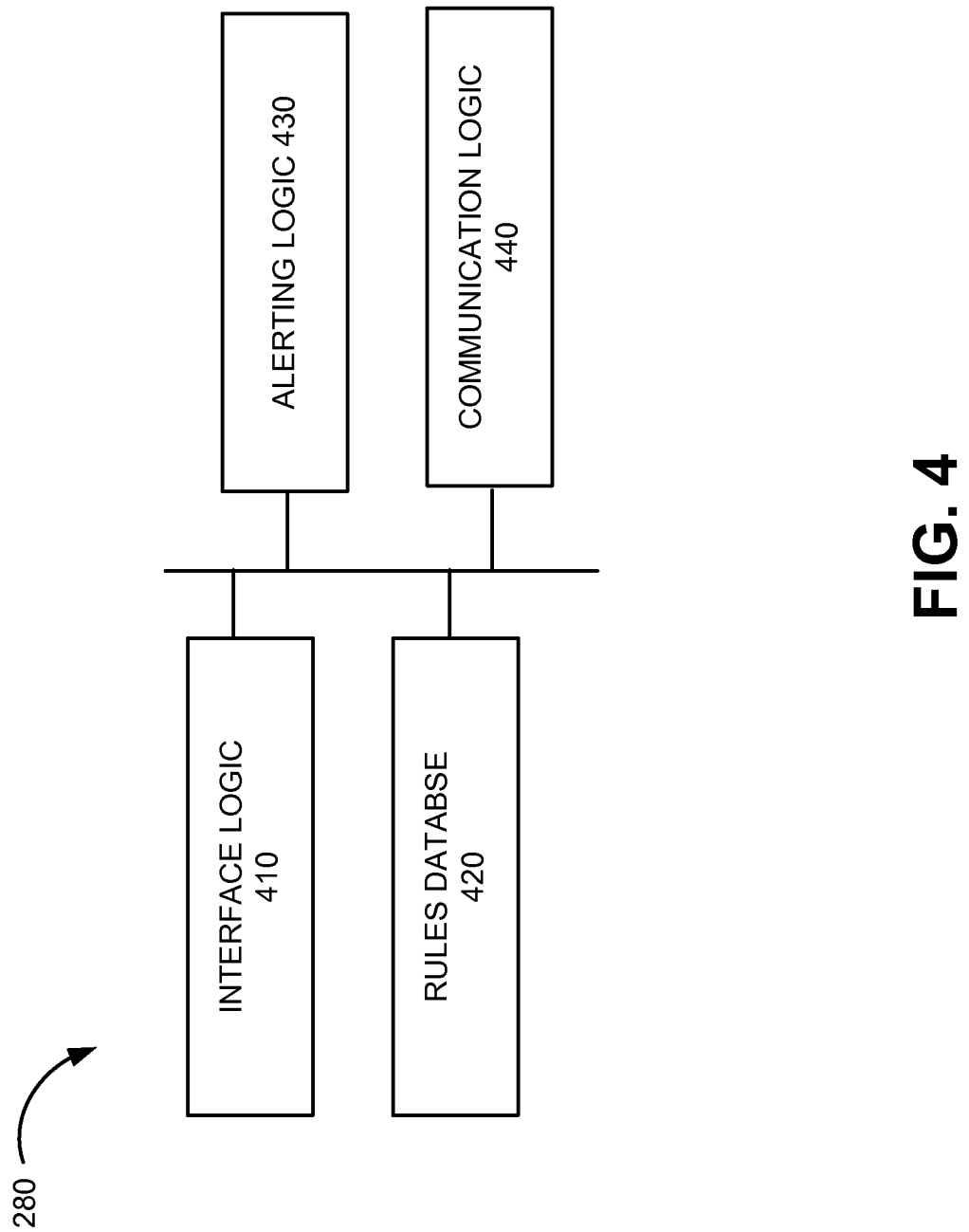
FIG. 4 illustrates an exemplary configuration of logic components implemented in the alert processing engine of FIG. 2.

FIG. 4 is a functional block diagram of alert processing engine 280 according to an exemplary implementation. The logical blocks illustrated in FIG. 4 may be implemented in software, hardware, or a combination of hardware and software. For example, some or all of the logical blocks illustrated in FIG. 4 may be implemented by processor 320 executing instructions stored in memory 330. In one implementation, alert processing engine 280 may be located within a call center, such as call center 140 or call center 150. In other implementations, alert processing engine 280 may be located externally with respect to a call center and may be used to monitor calls associated with multiple call centers.

Referring to FIG. 4, alert processing engine 280 may include interface logic 410, rules database 420, alerting logic 430 and communication logic 440. Interface logic 410 may include a front end that receives information associated with calls, such as information from message broker 230, monitoring engine 220, correlation engine 250, etc., and/or accesses information from other devices in monitor and alert system 160, such as customer databases 260 and agent databases 270.

Rules database 420 may store rules or procedures identifying how to handle various scenarios based on information received from elements of monitor and alert system 160. For example, rules database 420 may store rules identifying whether to forward an alert, escalate an alert, signal an external system to link a supervisor's workstation to an in-progress call, etc. Rules database 420 may also be updated over time based on various factors, such as success rates when supervisors become involved in calls, etc.

Rules database 420 may also store rules for determining whether to forward an alert based on contextual information associated with a call, such as the reason for the call, the particular agent's experience and success rate in handling similar calls, whether the customer is a "premium" customer that subscribes to the highest level of service, whether the customer is a mid-tier or average customer, whether the customer is a frequent caller, the agent's overall rating, etc. For example, rules database 420 may store a rule regarding premium customers indicating that an alert is to be forwarded to the supervisor immediately upon detecting any word/phrase that indicates that the premium customer may be experiencing a problem that the agent is having trouble resolving. Rules database 420 may store another rule indicating to not forward an alert to a supervisor if the agent handling the current call is a highly rated agent (e.g., based on his/her handling of previous calls).

Rules database 420 may also store rules identifying whether to alert the supervisor based on the time of day, the region from which the customer is calling, the supervisor's current workload, etc. For example, if the supervisor is currently "in-call" with another agent, rules database 420 may indicate that the alert should not be sent, or that the alert should be sent after the supervisor is no longer in-call. As another example, rules database 420 may store a rule indicating that a supervisor is not to be alerted until monitoring engine 220 has identified two or more key words/phrases uttered within a predetermined time (e.g., 15 seconds) of each other. In general, rules database 420 may store a large number of rules identifying a next best action for monitor and alert system 160, as described in more detail below.

Alerting logic 430 may access rules database 420 to determine an action to take based on the particular scenario. For example, alerting logic 430 may generate and forward a real time alert to a supervisory agent when key words/terms are identified in an in-progress call, as described in detail below. Alerting logic 430 may also highlight certain calls that are forwarded to the supervisor's workstation so that the supervisor can easily identify potential issues, as well as easily join problem calls, as described in more detail below. For example, alerting logic 430 may generate user interface screens that highlight particular calls via a bold font, large font, flashing icons, color, etc., to allow the supervisor to quickly identify issues that may require attention.

Communication logic 440 may include logic that forwards a desired communication, such as an alert or message to a supervisory agent. Communication logic 440 may also include logic that initiates or implements linking a supervisor's workstation into a call. For example, communication logic 440 may signal one or more network devices, such as gateways or servers located in a call center to link a supervisory agent into a call.

Figure 5:
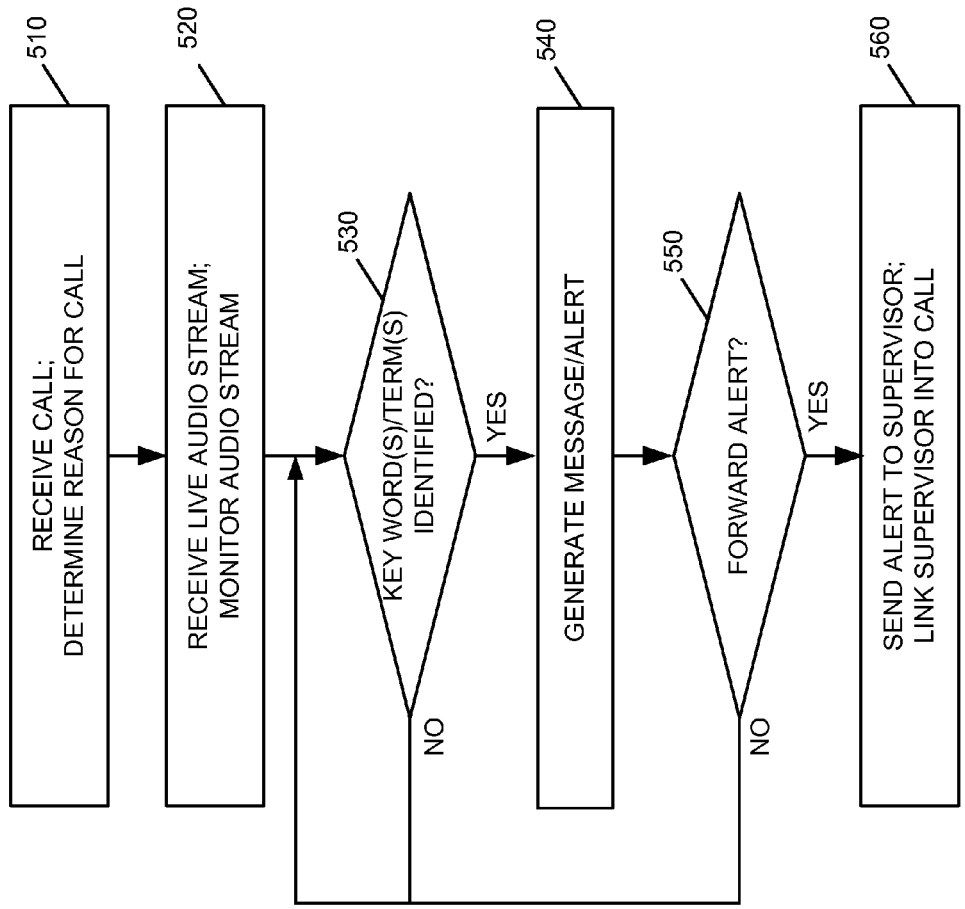
FIG. 5 is a flow diagram illustrating exemplary processing associated with monitoring customer calls.

FIG. 5 is a flow diagram illustrating exemplary processing associated with monitoring calls in network 100. Processing may begin with a caller (also referred herein as a user or a customer) at user device 110 establishing communications with call center 140 (block 510). For example, assume that a customer at user device 110 calls a telephone number associated with call center 140 (e.g., voice portal 142) or enters an Internet address associated with call center 140. In each case, assume that voice portal 142 interacts with the caller to determine the nature or reason for the call (block 510). For example, an IVR system at voice portal 142 may interact with the caller and provide a list of options that identify possible reasons for the call, such as a billing inquiry, a new service inquiry, a request to cancel service, a request to upgrade service, a request to track a service order, etc. Assume that the customer selects one of the options that identify the reason for the call. Voice portal 142 forwards the information identifying the reason for the call to ACD 144. ACD 144 receives the information and forwards the call to an appropriate one of agent WSs 146 associated with an agent that can handle the call. The call between the customer and the agent may then commence.

Audio acquisition engine 210 receives the live audio stream for the call involving the customer and the agent (block 520). For example, audio acquisition engine 210 may receive the live audio stream via a gateway server or other network device that couples monitor and alert system 160 to call center 140. Monitoring engine 220 may then monitor the audio stream for any key words, terms or phrases that may indicate a problem (block 520).

As one example, monitoring engine 220 may perform speech recognition in real time (or near real time) on the received audio stream and determine whether one or more key words or phrases were spoken by the customer or the agent (block 530). For example, assume that rules database 420 stores the words/phrases "bill too high," "early termination fee," "cancel," "supervisor," as key words or phrases. In this example, assume that that phrases "bill too high" and "early termination fee" were spoken by the customer and/or the agent. Monitoring engine 220 may identify these phrases as they are spoken (block 530—yes).

Message broker 230 may then generate an alert or message and forward the alert/message to alert processing engine 280 for further processing (block 540). Alert processing engine 280 may receive the message, identify the agent's supervisor via agent databases 270 and determine whether to forward the alert to the supervisor's workstation (block 550).

For example, alert processing engine 280 may determine that the agent handling the call in which the key words/terms were identified is a top rated agent, based on KPIs or other metrics stored in agent databases 270. In this case, alert processing engine 280 may determine that the supervisory agent does not have to be alerted at the current time (block 550—no) and monitor and alert system 160 continues to monitor the call.

If, however, alert processing engine 280 determines that the message is to be forwarded based on rules stored in rules database 420 (block 550—yes), alert processing engine 280 sends an alert to supervisory agent WS 148 (block 560). The alert may be a message sent to the supervisory agent WS 148, a text message "popped" or superimposed on the screen of WS 148, etc. In some implementations, the alert may be part of a user interface provided to WS 148 by alert processing engine 280 in which the particular call is highlighted or identified in some manner, such as a large, bold font, a flashing icon, color, etc., as described in more detail below.

Alert processing engine 280 may also link the supervisor's workstation into the in-progress call (block 560). For example, in some implementations, communication logic 440 may signal a gateway server or other network device at call center 140 to automatically link the supervisor's workstation into the call as the call is in-progress. In this manner, the supervisor at supervisory agent WS 148 may be able to assist the customer in fulfilling the objective of the call and to also avoid a disgruntled customer from possibly canceling his/her service or order. In other implementations, the supervisor may select, via the user interface, whether to join the in-progress call. In each case, the supervisor is able to quickly identify potential problems and join a call to aid the agent.

As described above, monitor and alert system 160 may monitor calls, determine whether any key words/terms are spoken during the call, determine contextual information regarding the customer, agent and call, and other information associated with the call and determine whether to signal a supervisory agent. As also described above, a supervisory agent may be responsible for monitoring a large number of agents. As a result, monitor and alert system 160 may provide a number of different user interfaces that allow a supervisor to easily monitor a large number of agents.

Figure 6A:
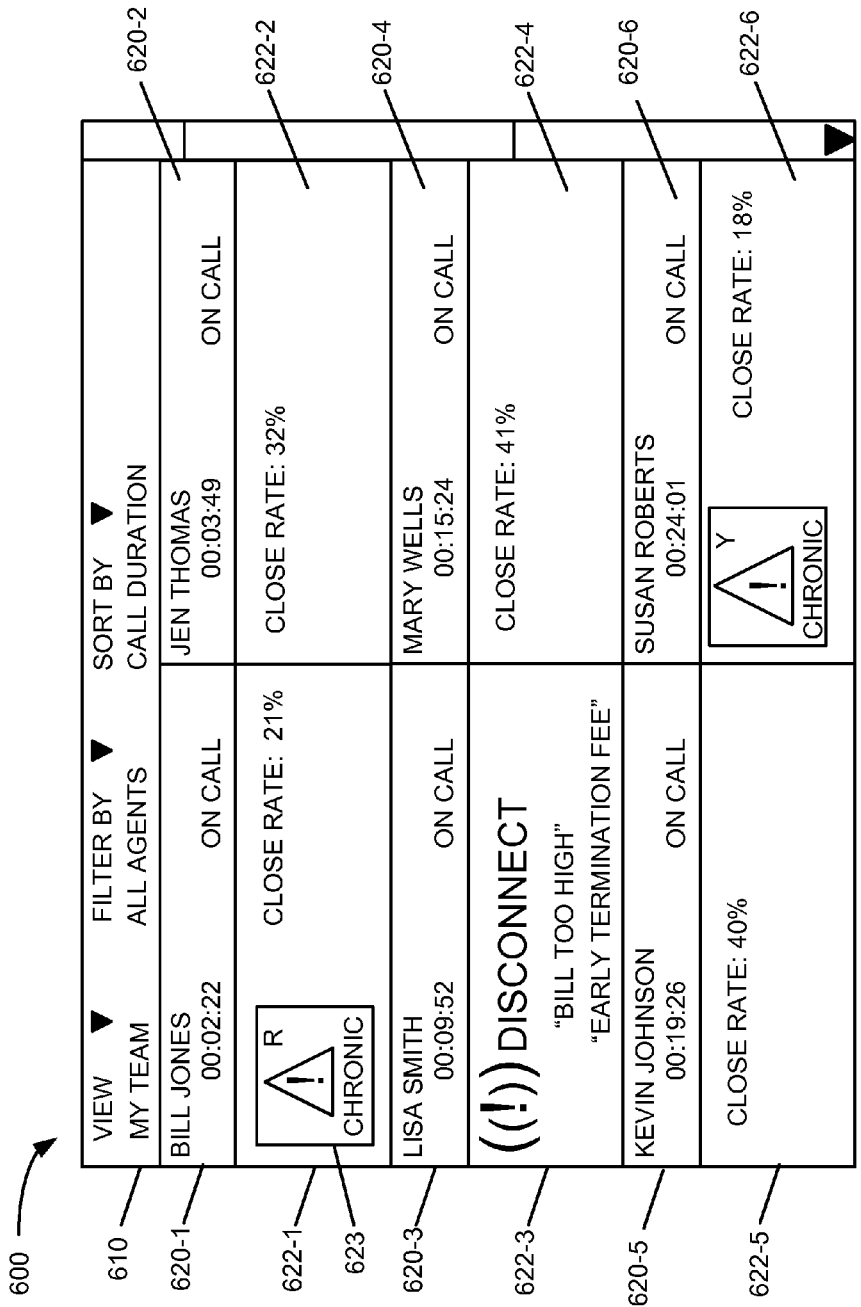

For example, FIG. 6A illustrates an exemplary user interface screen 600 provided to a supervisory agent WS 148 (or supervisory agent WS 158) by, for example, alert processing engine 280. Referring to FIG. 6A, interface screen 600 includes area 610 that allows the supervisor to view his/her agents, as well as filter the listing of agents by various factors, such as ratings, experience, all agents on duty, etc. Area 610 may also include options to allow the supervisor to filter calls based on various factors, such as call duration. For example, interface screen 600 in FIG. 6A is filtered by call duration such that calls that are in progress are sorted from shortest to longest. In addition each of the options in area 610 may include drop-down menus that enable the supervisor to easily change the view of interface screen 600.

Interface screen 600 also includes a number of blocks or cells 620 (e.g., 620-1 through 620-6) illustrated in FIG. 6A corresponding to agents. As illustrated, block 620-1 includes the name of the agent (i.e., Bill Jones in this case), an indication that the agent is currently handling a call (e.g., "on call") and information indicating the duration of the current call. Each of blocks 620 associated with an agent also includes a corresponding area or block 622 that provides other information associated with the agent. For example, block 622-1 associated with agent Bill Jones indicates that Bill has a close rate of 21%. The close rate may be based on metrics generated by a call center based on the agent's success rate in signing a customer up for a service, such as telephone service, television service and Internet services.

Block 622-1 also indicates that the call in progress is associated with a "chronic" issue. For example, the customer may have called the call center multiple times over a period of time (e.g., two or more times over a period of seven days) to resolve some issue, such as an issue with his/her television service. In this case, the customer may have interacted with the call center via an IVR system at voice portal 142 and determined that the call is about an issue that has not been resolved. As a result, call center 140 may provide information to monitor and alert system 160 indicating that call is associated with a repeat issue or a chronic issue. In addition, if the customer has called on the same issue a predetermined number of times, such as three or more, over a period of time, such as seven days, monitoring engine 220 may determine that the chronic issue is severe. In this case, monitor and alert system 280 may output block 623 in area 622-1 with an alert indicator (e.g., an exclamation point inside a triangle) along with the label "chronic." In addition, if the chronic issue is considered severe, block 623 may include the letter "R," and the background for block 623 may be displayed with the color red. If the chronic issue is not considered severe, the chronic indicator may include the letter "Y" (as indicated in block 622-6) and the background of that block may be displayed with the color yellow. This will allow the supervisory agent to quickly identify potentially important problems that may require assistance.

As discussed above, if monitor and alert system 160 identifies particular words/terms identified during a conversation, monitor and alert system 160 may send an alert to the supervisor's workstation, such as alert in block 622-3 associated with a call being handled by agent Lisa Smith. As illustrated, block 622-3 includes the term "Disconnect," displayed with a large and bold font, which indicates that the customer may want to discontinue or terminate his/her service provided by the service provider. In one implementation, the "disconnect" alert may be generated based on the customer's interaction with an IVR system at a voice portal. For example, the IVR system may provide the user with a number of options to identify the reason for the call. In this case, the customer may select an option to cancel or disconnect/terminate his/her service. In another scenario, the customer may have been connected to the agent and voiced the term "cancel" or "disconnect." In still another scenario, the customer and/or agent may have voiced terms associated with a typical request for terminating his/her service, such as "early termination fee." In each case, alert processing engine 280 may output the disconnect alert via user interface 600, as illustrated in FIG. 6A. In addition, block 622-3 also includes information voiced by the customer or the agent during the current call. In this example, the phrases "bill too high" and "early termination fee" were identified by monitoring engine 220. Monitoring engine 220 forwards this information to message broker 230, which generates the alert/message for display in block 622-3. Alert processing engine 280 then determines that the "disconnect" alert should be provided to the supervisor, as illustrated with the word "disconnect" and the exclamation point in a large, bold font. The entire background area of block 622-3 may also be displayed in the color red to allow the supervisor to quickly identify problem calls.

The supervisor may then select block 622-3 to intercede in the pending call. For example, the supervisor may select block 622-3 by clicking anywhere inside block 622-3. As a result, alert processing engine 280 provides user interface 640 illustrated in FIG. 6B. Referring to FIG. 6B, user interface 640 includes block 624 located below block 622-3. As illustrated, block 624 includes selection buttons labeled "alert," "customer info," and "join call." By selecting "alert," the supervisor may send an alert to another agent (e.g., another supervisor, the supervisor's supervisor, etc.). By selecting "customer info," alert processing engine 280 may access customer databases 260 to retrieve additional information regarding the customer, such as the customer's level of service, calling history, billing history, etc. By selecting "join call," alert processing engine 280 may link the supervisor's workstation into the call. For example, alert processing engine 280 may signal audio acquisition engine 210 to forward the audio feed from the call to the supervisor's workstation so that the supervisor can listen in on the call between the agent and the customer.

Assume that the supervisor selects "join call." Alert processing engine 280 signals audio acquisition engine 210 and the audio feed for the call is forwarded to the supervisor's workstation. Alert processing engine 280 may also output user interface 660 illustrated in FIG. 6C. Referring to FIG. 6C, block 624 includes "alert," and "customer info" buttons, as described above with respect to FIG. 6B. Block 624 also includes block 670 labeled "in call," indicating that the supervisor is receiving the audio feed. Block 624 also includes block 672 labeled "leave call," and block 674 labeled "mute microphone." By selecting leave call block 672, the supervisor may stop receiving the audio feed. By selecting mute mic block 674, the supervisor may mute his/her microphone so that no external sound is picked up for the conversation involving the customer and the agent. In this manner, monitor and alert system 160 provides user interface screens to the supervisory agent WS (e.g., WS 148 or 158) to allow the supervisor to easily identify potential problem calls and optionally join a call in which the agent requires assistance. The supervisor may then provide information to the customer that the agent may not be providing to assist the customer. This may allow the service provider to avoid a customer canceling his/her service.

Figure 7:
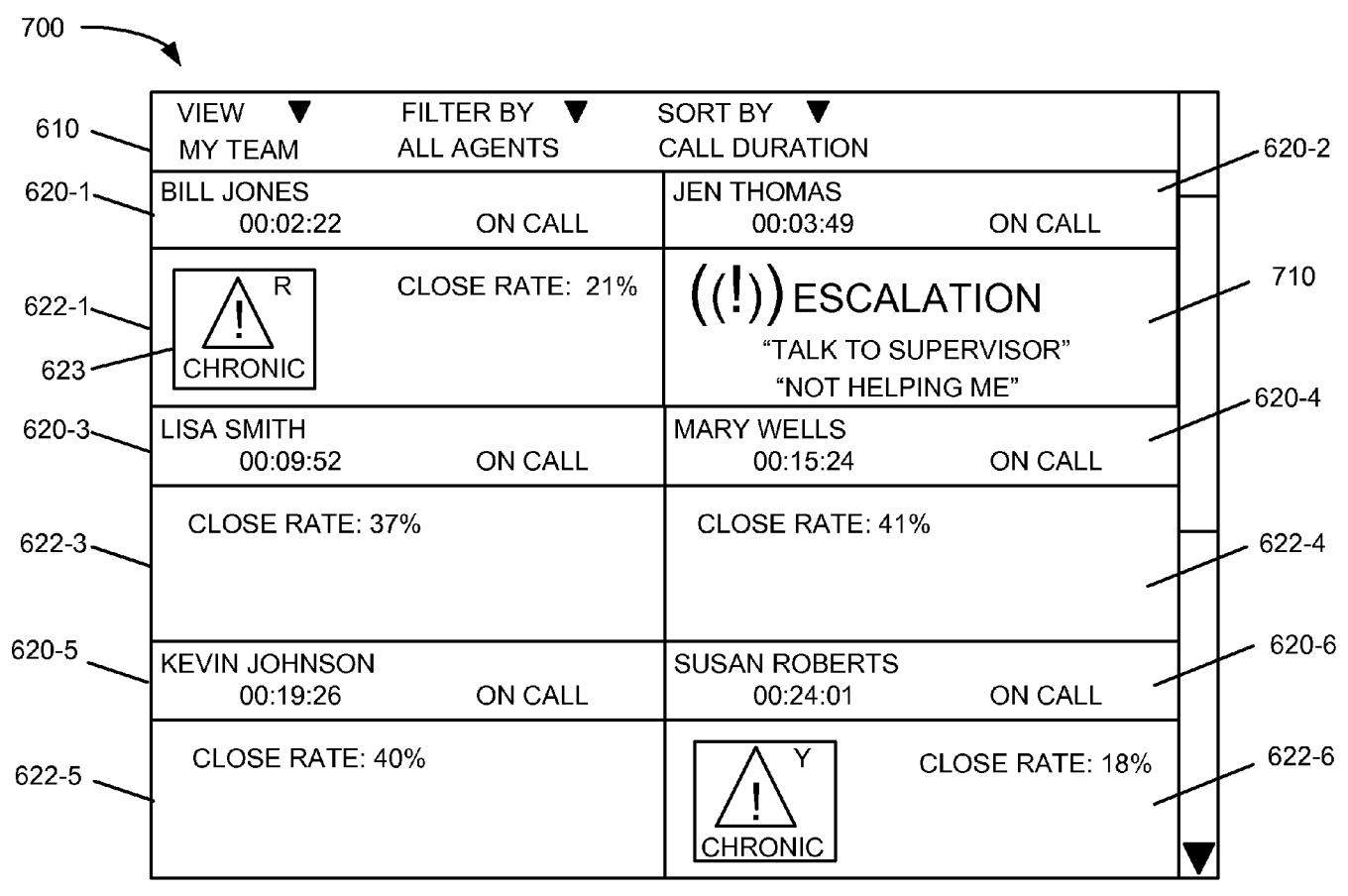

FIG. 7 illustrates another exemplary user interface provided by alert processing engine 280 to a supervisor's workstation. Referring to FIG. 7, user interface 700 illustrates a scenario in which an "escalation" alert is generated by alert processing engine 280. For example, a customer may be talking to agent Jen Thomas, as illustrated in block 620-2. In this case, assume that monitoring engine 220 has identified the phrase "talk to supervisor," and "not helping me." In this case, message broker 220 generates an escalation alert. Alert processing engine 280 may then determine whether to output the escalation alert, or whether there is additional information indicating that such an alert is not needed.

For example, if contextual information from correlation engine 250 indicates that agent Jen Thomas has handled similar calls with a good success rate, alert processing engine 280 may not output the escalation alert indicator. In this case, assume that alert processing engine 280 determines that the escalation alert is needed. As a result, alert processing engine 280 outputs the escalation alert illustrated in block 710. As illustrated, block 710 includes the word "escalation," in a large, bold font, along with the phrases "talk to supervisor" and "not helping me". The background of block 710 may also be provided with the color red. In this manner, the supervisor may determine whether to intercede on the call with the escalation alert.

For example, the supervisor may select block 710 and be provided with options to join the call, similar to block 624 illustrated in FIG. 6B. If the supervisor joins the call, the supervisor may be able to satisfy the customer and provide the desired assistance or information.

FIG. 8 illustrates another exemplary user interface provided by alert processing engine 280 to a supervisor's workstation. Referring to FIG. 8, user interface 800 illustrates a scenario in which a "coach agent" alert is generated by alert processing engine 280. For example, a customer may be talking to agent Bill Jones, as illustrated in block 620-1. In this case, assume that monitoring engine 220 has identified the phrase "call us back." Rules database 420 may store the phrase "call us back" as corresponding to a phrase that should not be used by agents. For example, agents may be trained to avoid call backs since call backs may result in customer dissatisfaction, as well as unnecessarily causing congestion associated with receiving too many calls at a call center. In this case, message broker 230 generates a "coach agent" alert and forwards the alert to alert processing engine 280. Alert processing engine 280 may then output a "coach agent" alert, as illustrated in block 810, along with the phrase "call us back."

As illustrated, the phrase "coach agent" may be displayed in a large, bold font. In addition, the background of block 810 may be displayed with the color red. Alternatively, the background of block 810 may be displayed with the color yellow since the coach agent alert may be less important than other alerts, such as a disconnect or escalation alert.

In this manner, the supervisor may determine whether to intercede on the call with the coach agent alert. For example, the supervisor may select block 810 and be provided with options to join the call, similar to block 624 illustrated in FIG. 6B. If the supervisor joins the call, the supervisor may be able to satisfy the customer's issue, without requiring another call at a later time.

FIG. 9 illustrates another exemplary user interface provided by alert processing engine 280 to a supervisor's workstation. Referring to FIG. 9, user interface 900 illustrates a scenario in which an "activation fee" alert is generated by alert processing engine 280. For example, a customer may be talking to agent Mary Wells, as illustrated in block 620-4. In this case, assume that monitoring engine 220 has identified the phrase "waive activation fee." Rules database 420 may store the phrase "waive activation fee" as corresponding to a phrase that should not be used by agents. For example, agents may not have the authority to waive an activation fee for a service. In this case, message broker 230 generates an "activation fee" message and forwards the message to alert processing engine 280. Alert processing engine 280 may then output an "activation fee" alert, as illustrated in block 910, along with the phrase "waive activation fee."

As illustrated, block 910 includes the word "activation fee," in a large, bold font, along with the phrase "waive activation fee." The background of block 910 may also be provided with the color red. In this manner, the supervisor may determine whether to intercede on the call to clarify whether the activation fee can be waived.

For example, the supervisor may select block 910 and be provided with options to join the call, similar to block 624 illustrated in FIG. 6B. If the supervisor joins the call, the supervisor may determine whether waiving an activation fee is appropriate and/or provide clarification information to the customer to avoid any problems at a later time.

As described above and illustrated, various user interface screens may provide different alerts and/or different levels of alerts based on the particular words/phrases spoken by the customer and/or the agent. In addition, alerts may be prioritized based on rules and/or patterns stored in, for example, rules database 420. This may allow monitor and alert system 160 to optimize the use of supervisors' time. In each case, the supervisor may be able to easily ascertain the issue and decide whether to join the call.

The information identified by monitoring and alert system 160 may also be used to determine whether agents are providing the required customer service while the call is in-progress, or after the call is completed. For example, if a customer expressed interest in a certain product during the call, monitoring engine 220 and/or alert processing engine 280 may determine whether the agent is trying to upsell the customer, such as going through a company standard upsell flow procedure. If monitoring engine 220 does not detect certain words or phrases during the call, monitoring engine 220 may determine that the agent is not providing the desired upsell to the customer. In this case, alert processing engine 280 may send a message/alert directly to the agent's workstation as guidance or a reminder to provide the desired upsell. Alternatively, or in addition, the supervisor may receive a "coach agent" or "upsell not followed" alert.

As another example, if a call associated with dispatching a technician is commencing, monitoring engine 220 can monitor the call to determine whether the required troubleshooting steps have been walked through with the customer. If such steps have not been done, alert processing engine 280 may send guidance directly to the agent's WS. In cases where the agent still does not adhere to the guidance during the call, alert processing engine 280 may send an alert to the supervisor's WS.

As still another example, if a customer expresses negative sentiments during a call, alert processing engine 280 may suggest that the agent provide a promotional offer to the customer. The promotional offer may be also based on other information, such as whether the customer is a premium customer (e.g., customer subscribes to telephone, television and Internet services from the service provider) and has been a premium customer for at least a predetermined period of time (e.g., two years). Such information may be obtained by alert processing engine 280 via customer databases 260 which includes customers' profiles.

In another case, if a customer has indicated that he/she is moving shortly, alert processing engine 280 may check to see if the agent has asked follow up questions regarding the customer's new location and determine whether the service provider provides service in the new location. If the agent has not asked the company designated follow up questions, alert processing engine 280 may send information directly to the agent's WS to provide guidance to the agent.

Monitor and alert system 160 may also monitor or review calls after the calls are completed. For example, monitor and alert system 160 may use the presence or absence of key words/terms, upsell flow procedures, follow-up flow procedures, etc., to determine whether agents are following company guidelines. The identification of terms/lack of identification of terms may then be used as part of an agent's evaluation. In addition, positive words/phrases, such as "Thanks, I appreciate all your help," "you were very helpful," etc. may be used in the evaluation to bolster the agent's evaluation.

In addition, monitor and alert system 160 may also correlate metrics associated with calls to churn rates, customer satisfaction, etc. For example, alert processing engine 280 may correlate negative sentiments expressed by a customer during the call with information identifying whether the customers have canceled/changed their service. Alert processing engine 280 may also correlate first call resolution metrics to a churn rate for customer. That is, if a customer has been assisted on a first call to a call center, such information may be correlated to whether the customer has maintained his/her service. As another example, alert processing engine 280 may correlate terms such as "bill too high" with the expiration of a customer's low cost promotion rate for a service. In each case, a service provider can use the metrics obtained by monitoring calls to better train agents and/or change policies associated with various services and rates to attempt to retain customers.

Implementations described herein relate to monitoring communications between customers and call center agents. In one implementation, a customer's call with an agent is monitored in real time to determine whether the call indicates an issue that should be brought to the attention of a supervisory agent based on one or more key words or terms voiced by the customer or the agent during the call. In some implementations, information associated with the call that is obtained from other devices/systems may be used to aid in determining whether to forward an alert and/or determining the level of alert. This may prevent a supervisor from receiving too many alerts and not being able to focus on the most important calls that may require immediate assistance. As a result, a service provider may maximize the use of supervisory agents' time to avoid issues that may result in loss of revenue, such as cancellation of a service. In addition, customer frustration associated with interactions with a call center may be reduced.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

Although the implementations have been described above with respect to receiving telephone calls at a call center, in other implementations, other types of communications may be received at a call center or a contact center. For example, in other implementations, a contact center may receive video calls, video chats, electronic mail messages, text messages, instant messages or chats, facsimile messages, or any other type of communication. In each case, the communication may be handled in the same manner as described above. That is, words and phrases provided during a "conversation" may be monitored to determine whether to generate an alert to a supervisor.

In addition, features have been mainly described above with respect to receiving a telephone call via a user device 110. As described above, user device 110 may be a SIP-based telephone. In such instances, SIP headers may be used to convey information to various devices in network 100. For example, information identifying a reason for a call, a customer's account number, etc., may be provided in the SIP header of various SIP messages associated with calls processed by alert and monitor system 160.

Still further, features have been mainly described above with respect to a particular type of call/contact center. It should be understood that call/contact centers 140 and 150 may be associated with any type of merchant or service provider that may use a call/contact center to provide services to customers.

In addition, while series of acts have been described with respect to FIG. 5, the order of the acts may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method, comprising:
receiving, at a call center, a call from a customer;
identifying an agent to handle the call;
forwarding the call to the agent;
monitoring the call between the customer and the agent to identify whether one or more particular words or phrases was voiced by the customer or the agent;
determining, based on the monitoring, that a first word or phrase of the one or more particular words or phrases was voiced by the customer or the agent;
identifying at least one of a rating of the agent or a customer level associated with the customer;

generating an alert or message to forward to a workstation associated with a supervisor in response to determining that the first word or phrase or was voiced and at least one of that the rating of the agent is less than a threshold level or the customer level associated with the customer is above a threshold level; and forwarding the alert or message to the workstation associated with the supervisor.

2. The method of claim 1, further comprising:
receiving, from the workstation associated with the supervisor, an input to join the call; and
linking an audio feed for the call to the workstation associated with the supervisor.

3. The method of claim 1, further comprising:
automatically linking an audio feed for the call to the workstation associated with the supervisor in response to determining that the first word or phrase was voiced.

4. The method of claim 1, wherein the first word or phrase is associated with the customer canceling, disconnecting or terminating a service provided to the customer.

5. The method of claim 4, further comprising:
outputting, to a display of the workstation and in response to determining that the first word or phrase was voiced, an interface screen including a visual indication corresponding to a potential cancelation, disconnection or termination of the service, and
wherein the interface screen displays information identifying a plurality of agents and corresponding visual indicators indicating problems for multiple ones of the plurality of agents.

6. The method of claim 5, wherein the outputting further comprises:
providing, via the interface screen, an option for the supervisor to join the call.

7. The method of claim 1, further comprising:
receiving, at the call center, a second call from a second customer;
forwarding the second call to a second agent;
monitoring the second call to identify whether the one or more particular words or phrases was voiced by the second customer or the second agent;
identifying, based on the monitoring, that a second word or phrase of the one or more particular words or phrases was voiced by the second customer or the second agent; and
determining whether to forward a second alert or message to a second workstation associated with a second supervisor, in response to identifying the second word or phrase, based on information associated with the second call.

8. The method of claim 7, wherein the determining whether to forward the second alert or message based on information associated with the second call comprises:
identifying a reason for the second call, a rating of the second agent, a customer level associated with the second customer, and the identified second word or phrase; and
forwarding the second alert or message, in response to determining that the reason for the second call matches a particular reason, the rating of the second agent is less than a threshold level, the customer level associated with the second customer is above a threshold level and the second word or phrase is associated with a potential cancelation of a service.

9. The method of claim 7, wherein the determining whether to forward the second alert or message comprises:

determining a number of times that the one or more particular words or phrases was voiced by the second customer or the second agent, and
determining to forward the second alert or message in response to determining that the number of times is greater than a threshold number.

10. The method of claim 7, wherein the determining whether to forward the second alert or message comprises:
determining an emotional state of the second customer, and
determining to forward the second alert or message in response to determining that the determined emotional state corresponds to at least one of anger or frustration.

11. The method of claim 1, wherein the alert or message corresponds to one of a termination alert, an escalation alert, or a coaching alert.

12. The method of claim 1, wherein the monitoring comprises:
monitoring the call in real time.

13. A system, comprising:
a memory configured to store information identifying a plurality of agents and supervisors associated with the plurality of agents;
a workstation associated with a first supervisor; and
at least one computing device configured to:
monitor a call between a caller and an agent at a contact center to identify whether one or more particular words or phrases was voiced by the caller or the agent,
determine, based on the monitoring, that a first word or phrase of the one or more particular words or phrases was voiced by the caller or the agent,
determine whether to generate an alert to forward to a supervisor in response to determining that the first word or phrase or was voiced,
access the at memory to identify a supervisor associated with the agent, in response to determining to generate the alert, and
generating and forwarding the alert, in response to determining to generate the alert, to the workstation associated with the first supervisor,
wherein the workstation includes a display configured to simultaneously display information identifying multiple ones of the plurality of agents and corresponding visual indicators indicating problems associated with calls involving the multiple ones of the plurality of agents.

14. The system of claim 13,
wherein the at least one computing device is further configured to:
receive, from the workstation associated with the first supervisor, an input to join the call, and
provide an audio feed from the call to the workstation associated with the first supervisor.

15. The system of claim 14, wherein the first word or phrase is associated with the caller potentially canceling or disconnecting a service provided to the caller, and
wherein the at least one computing device is further configured to:
output, to the display of the workstation, an interface screen including a visual indicator corresponding to a potential cancelation or disconnection of the service.

16. The system of claim 13, wherein when determining whether to generate an alert, the at least one computing device is configured to determine whether to generate the alert based on information associated with the call.

17. The system of claim 16, wherein when determining whether to generate an alert based on information associated with the call, the at least one computing device is configured to:
    identify at least two of a reason for the call, a rating of the agent, a level associated with the caller, a time of day, a number of times that the one or more particular words or phrases was voiced by the caller or the agent, or the first word or phrase.

18. The system of claim 13, wherein the at least one computing device is further configured to:
    provide different levels of alerts based on different ones of the particular words or phrases voiced by the caller or the agent.

19. A method, comprising:
    receiving, at a contact center, a communication from a party;
    identifying an agent to handle the communication;
    forwarding the communication to the agent;
    monitoring communications between the party and the agent to identify whether one or more particular words or phrases was used by party or the agent;
    determining, based on the monitoring, that a first word or phrase of the one or more particular words or phrases was used by the party or the agent;
    identifying a rating of the agent;
    identifying a customer level associated with the customer;
    determining whether to forward an alert or message to a workstation associated with a supervisor in response to determining that the first word or phrase or was used, and at least two of: the rating of the agent is less than a threshold level, the customer level associated with the customer is above a threshold level, or the first word or phrase is associated with a potential cancelation of a service; and
    forwarding the alert or message to the workstation associated with the supervisor in response to determining to forward the alert or message.

20. The method of claim 19, wherein the determining whether to forward the alert or message comprises:
    identifying information associated with at least one of the party, the agent or the communications between the party and the agent, and
    determining whether to forward the alert or message based on the identified information associated with the at least one of the party, the agent or the communications between the party and the agent.

* * * * *